United States Patent
Grohmann et al.

(10) Patent No.: US 8,628,046 B2
(45) Date of Patent: Jan. 14, 2014

(54) CONTROL SYSTEM

(75) Inventors: Boris Grohmann, Bouc Bel Air (FR); Gregor Paulmann, Grasbrunn/Neukeferloh (DE)

(73) Assignee: Eurocopter, Marignane Cedex (FR)

( * ) Notice: Subject to any disclaimer, the term of this patent is extended or adjusted under 35 U.S.C. 154(b) by 319 days.

(21) Appl. No.: 13/116,117

(22) Filed: May 26, 2011

(65) Prior Publication Data

US 2012/0032031 A1    Feb. 9, 2012

(30) Foreign Application Priority Data

Aug. 4, 2010   (EP) .................................. 10400037

(51) Int. Cl.
*B64C 13/04*    (2006.01)

(52) U.S. Cl.
USPC .......... 244/221; 244/232; 244/99.2; 244/99.3

(58) Field of Classification Search
USPC .............. 244/220, 221, 228, 232, 99.2, 99.3
See application file for complete search history.

(56) References Cited

U.S. PATENT DOCUMENTS

| | | | |
|---|---|---|---|
| 3,330,477 A * | 7/1967 | Stephens ..................... | 235/61 C |
| 3,735,228 A | 5/1973 | Redmond | |
| 4,112,824 A | 9/1978 | Krause | |
| 4,137,784 A | 2/1979 | Griffin | |
| 4,281,810 A * | 8/1981 | Poisson-Quinton et al. | 244/99.3 |
| 4,759,515 A * | 7/1988 | Carl ............................ | 244/76 R |
| 5,058,825 A * | 10/1991 | Rabouyt ..................... | 244/17.25 |
| 5,144,851 A | 9/1992 | Grimm | |
| 6,206,329 B1 * | 3/2001 | Gautier et al. ............... | 244/221 |
| 6,257,529 B1 * | 7/2001 | Kubo et al. .................. | 244/221 |
| 7,100,870 B2 | 9/2006 | Flatt | |
| 2004/0251061 A1 | 12/2004 | Augustine | |

FOREIGN PATENT DOCUMENTS

| | | |
|---|---|---|
| EP | 0325027 A1 | 7/1989 |
| EP | 1036734 A2 | 9/2000 |
| EP | 1037130 A2 | 9/2000 |

OTHER PUBLICATIONS

AugustaWestland Launches HEAT Programme for EH101 Merlin.
Aircraft Systems and Mechanical. Electrical, and Avionics Subsystems integration. Third edition. By Iam Moir & Allan Seabridge. Copyright, 2008. ISBN 978-0-470-05996-8. Cover page, table of contents, and Figure 1.12. 14 pages total.
Search Report and Written Opinion; Application No. EP10400037; dated Feb. 11, 2011.

* cited by examiner

*Primary Examiner* — Philip J Bonzell
(74) *Attorney, Agent, or Firm* — Brooks Kushman P.C.

(57) ABSTRACT

The invention relates to a control system and to a method of operating such a control system, particularly to a control system for pilot command inputs for a helicopter, with a mechanical input signal (2), at least one electric position sensor (21, 21') for said input signal (2), at least one electric power supply (25, 25') and at least one controllable, electromechanical actuator (27, 27') fed by the at least one electric power supply (25, 25') and controlled by the at least one electric position sensor (21, 21'). The mechanical input signal (2) is applied mechanically to the at least one controllable electromechanical actuator (27, 27').

18 Claims, 13 Drawing Sheets

State of the art

State of the art

CONTROL SYSTEM

CROSS REFERENCE TO RELATED APPLICATION

The present application claims priority benefit from European patent application EP 10 400037.7 of Aug. 4, 2010, the content of which is incorporated herein by reference.

FIELD OF THE INVENTION

The invention relates to a control system, particularly to a control system for pilot command inputs for a rotorcraft, notably a helicopter with the features of the preamble of claim 1 and to a method of operating such a control system.

BACKGROUND OF THE INVENTION (1) Field of the Invention

To control a helicopter, in general via the main rotor or tail rotor, the pilot has to send a command which moves the rotor blades. In case of installed servo systems either for comfort purposes or for necessary force amplification due to high air loads, the pilot command will activate an actuator motion.

There are two classical methods for the actuator power generation, electric or hydraulic. The hydraulic method needs a complex system of reservoirs, pumps, filters, valves, lines, etc. and implies important maintenance efforts. Such a hydraulic system is shown as example in FIG. 1 of the present application with reference to the publication: Aircraft Systems, Ian Moir, Allan Seabridge, AIAA Educational Series, 2008, particularly see FIG. 1.12 on page 19. The required reliability of electro-mechanical actuators is an important issue in aeronautics along with the reduction of redundancy and complexity for the usage of such electro-mechanical actuators.

(2) Description of Related Art

The document EP 0325027 (A1) discloses a mechanical actuator assembly which automatically releases the load controlled by the actuator when the actuator jams or otherwise fails. No hint to a fail free actuator as such can be derived from EP 0325027 (A1).

The document U.S. Pat. No. 5,144,851 (A) is directed to a jam tolerant ball screw actuator driven through a differential via plural power paths therein. A hint to a control system is not referred to in U.S. Pat. No. 5,144,851 (A).

The document U.S. Pat. No. 4,137,784 (A) discloses an electromechanical actuator which acts as an analogue of a fluid operated cylinder. A tubular piston moves along the axis of a fixed outer cylinder. One end of the piston is fitted with a threaded stud to which a clevis or other load attachment device can be attached. The object of U.S. Pat. No. 4,137,784 (A) is to provide reliable turn off functionality of the actuator.

The document U.S. Pat. No. 7,100,870 discloses a jam tolerant electromechanical actuating system in an aircraft and a method for controlling this system including: Locating a physical coupling/decoupling mechanism between the load and an actuator assembly as close as practicable to the load; constructing the coupling/uncoupling mechanism to be reversible, and hence testable; and controlling the connection/disconnection via decision making electronics which will detect any system failure by monitoring. The jam tolerant electromechanical actuating system of document U.S. Pat. No. 7,100,870 relies on at least two electromechanical actuator assemblies each of said actuator assemblies being provided with a motor, load and position sensors and a coupling/decoupling mechanism and a disconnect actuator rendering said actuator system heavy and complex.

In conventional usage of hydraulic actuators basically two methods remain for sending the pilot's command to the actuator, either by "Fly By Wire" (FBW), or mechanically by lever and bell crank linkage.

The document US 2004251061 (A1) discloses an active steering system being manually commanded by a mechanical linkage with variable assist including a differential actuator having an input gear and an output gear. The differential actuator has a default kinematic relationship between the input gear and the output gear such that magnitude of an output speed and an output torque is approximately equal to a magnitude of an input speed and an input torque with opposing directions. The system also includes an input device that is in operable communication with the differential actuator and an output device that is in operable communication with the differential actuator. The differential actuator is operable to vary a ratio between the input device and the output device. The system also includes a steering mechanism that is in operable communication with the differential actuator and the steering mechanism is configured to reverse the opposing directions to the output device. The mechanical gear arrangements of document US 2004251061 (A1), namely the differential actuators imply an inherent risk of jamming.

Electro-mechanical actuators comprise motors usually rotating at high speed. It needs a gearbox to transmit the high rotation speed into high torque. The usage of gearboxes brings important issues concerning the reliability. In automotive industry, such systems are used for servo steering systems. The safety requirements in automotive against mechanical jam are lower than for aerospace, which explains that they use motors with gearbox without problems. To apply such architecture to aerospace, the only solution would be to bring mechanical redundancies within the actuators and thus increase weight and complexity. Therefore this state of the art in automotive industry is not suitable for a helicopter.

The companies Agusta/Westland disclose (http://www.agustawestland.com/node/3307) a fly by wire system that utilises electric actuators in place of hydraulic units, to provide the control inputs to the helicopter's rotor systems. Unlike any other fly-by-wire system developed for helicopters the Agusta/Westland system uses electro-mechanical actuation technology for all flying controls, i.e. the main and tail rotors. The brushless electric motor actuators incorporate quadruple four lane architecture with fail technology that allow the system to function safely even after failure of two of the systems. The replacement of simplex mechanical flying control systems with quadruple electronic and mechanical systems, replaces complex hydraulic systems by complex electronic and mechanical systems. In the event of malfunction with the pilot command usually 3 or 4 sensors are needed for position and 2 computers for analysing the signals with all needed reliability adding to costs and complexity of such a control system.

The document U.S. Pat. No. 3,735,228 discloses an electric connecting link provided in a control system with FBW architecture without electronic amplification in aircraft control. Redundancy in the control system is provided by one or more actuator channels and transmission of electric power signals eliminates the need for electronic amplification. A multiplex actuator for positioning a control element in response to a mechanical input motion includes an input transducer responsive to the mechanical motion for generating a plurality of control voltages. These control voltages are transmitted to a plurality of servomotors with each motor responsive to a separate generated voltage. Velocity couplers tied to the outputs of the servomotors produce a single rotary output equal to the velocity sum of the plurality of servomotors. This single rotary output may be used directly or converted into a linear output motion that varies in accordance with the input motion. A feedback transducer responds to the output motion and generates a plurality of feedback voltages which are interconnected with the control voltages in a balancing network for control of the individual servomotors. Particularly the multiplex actuator for producing a position output in response to an input motion includes a movable core input transformer generating a plurality of control voltages. These control voltages are transmitted to a plurality of two-phase electric motors having a fixed phase winding and a control phase winding, the latter responsive to the control voltage. Velocity couplers tied to the output of the individual channel motors produce a single rotary output equal to the velocity sum of the two-phase motors. This rotary output may be used directly or converted into a linear output motion that varies in accordance with the mechanical input motion. A movable core feedback transformer responds to the output motion and generates a plurality of feedback voltages which are connected individually to one of the two-phase electric motors in a balancing network with the input transducer. The pluralities of servomotors with separately generated voltages add to costs and complexity of the system of document U.S. Pat. No. 3,735,228. Document U.S. Pat. No. 3,735,228 does neither describe any mechanical input to a sensor nor any mechanical input to an actuator allowing feedback for close loop architecture and incorporates fly by wire architecture internally.

The document EP 1036734 A2 discloses a servo actuator apparatus having: an actuator (13) which relatively displaces an operation unit (15) on the basis of an input signal E1; a position sensor (14) which detects a relative position of the operation unit (15) and outputs a detection signal DI; an actuator (23) which relatively displaces an operation unit (25) on the basis of an input signal E2; a position sensor (24) which detects a relative position of the operation unit (25) and outputs a detection signal D2; a difference calculation unit (12) which subtracts the detection signal D2 from a command signal CI supplied from a flight control computer (11), to output the input signal EI; and a difference calculation unit (22) which subtracts the detection signal D1 from a command signal C2 supplied from a flight control computer (21), to output the input signal E2, where a positive displacement direction of the operation unit (15) is reverse and series to that of the operation unit (25), and the body units of the actuators (13, 23) are integrally movable, and the actuators (13, 23) can always operate while mutually monitoring the actual operation, and have a function that, when one of the actuators fails and falls in hardover, the other actuator immediately corrects the hardover. In this way, prevention of a hardover or suppression of the degree of a hardover can be realized by a simple configuration.

The document EP 1037130 A2 discloses a flight control apparatus for a helicopter being configured by: a control unit (10) controlled by the pilot; a steering mechanism (14) for generating an aerodynamic control force; a link mechanism (12) for mechanically transmitting an amount of control Ma in the control unit (10) to the steering mechanism (14), thereby driving the steering mechanism (14); an amount-of-control sensor (30) for detecting the amount of control Ma in the control unit (10) and for supplying a control signal Sa; a flight control law calculation unit (32) for calculating a flight control law of the helicopter based on the control signal Sa, and for supplying a driving signal Sb for the steering mechanism (14); a difference calculation unit (33) for subtracting the control signal Sa from the driving signal Sb, and for supplying a difference signal Sc; a precision servo actuator unit (20) for adding the amount of control Ma transmitted via the link mechanism (12), to an amount of difference Mc corresponding to the difference signal Sc; and the like. According to this configuration, the apparatus can be easily applied to a mechanical control transmission mechanism of an existing helicopter, and the characteristics and performance of the control transmission mechanism can be remarkably increased.

The document U.S. Pat. No. 4,112,824 A discloses a hydraulic servosystem controlling an aircraft elevator 1 including a main channel 2 which is normally operative and a stand-by channel 3 which is automatically brought into operation if the main control slide 24 of the channel 2 becomes jammed. Attempts to move the jammed slide displace an inner slide 26 against a spring 27 to connect the supply for the main channel to drain through a passageway 50, 49 and 51. Pressure in a conduit 37 thus falls and a piston 48 is displaced by the pressure in a conduit 40 connected with the stand-by channel. Valves 43, 46 operated by the piston through a linkage 41, 42 cause the stand-by channel to take over from the main channel. A linkage 12, 13, 14 actuates the control slides through pins 15 which engage members (20) FIG. 2 (not shown) pivotally connected with rods (16) on the slides, the rods having slots (15') to accommodate the arcuate movement of the pins.

Fly by Wire is highly expensive and needs several redundancies to achieve the reliability need in aeronautics, i. e. several computers, several sensors, several communication buses for command and monitoring etc. Moreover, when the electric power shuts down, there will be no backup by Fly by Wire.

SUMMARY OF THE INVENTION

It is therefore an object of the invention to provide a control system, particularly a control system of manual pilot command inputs for a helicopter, avoiding the disadvantages of the state of the art and particularly avoiding the disadvantages linked to the use of a hydraulic power source and of any mechanical gear arrangement while reducing redundancy and complexity and more particularly avoiding the high complexity and prohibitive costs of fly-by-wire systems in smaller aircrafts/helicopters. It is a further object of the invention to provide a method for operation of such a control system.

A solution is provided with a control system with the features of claim 1 and a further solution is provided with a method for operation of such a control system with the features of claim 16. Preferred embodiments of the invention are provided in the dependent sub claims.

According to the invention a control system, particularly a control system of pilot's command inputs for a rotorcraft, namely a helicopter, more particularly for small to middle helicopters, is provided with a mechanical input command, at least one electric position sensor for said mechanical input command, at least one electric power supply and at least one controllable electromechanical actuator fed by the at least one electric power supply and controlled by the at least one electric position sensor. According to the invention the mechanical input command is applied via a mechanical linkage with a lever and an output shaft to the at least one controllable electromechanical actuator and said mechanical input command is applied at the same time by means of the lever in parallel to the command shaft of the at least one electric position sensor. Said mechanical linkage of lever and output shaft and lever and command shaft represents two parallel drive trains from the pilot's input to the blades of the rotor(s).

The electric position sensor of the inventive control system provides as a result of the mechanical linkage an electric signal responsive to displacement and speed of pilot's command motions controlling the at least one electromechanical actuator to drive electrically the output shaft according to the pilot's commands. The mechanical linkage of lever and output shaft provides a fail-safe system transmitting the mechanical input command mechanically to the at least one controllable electromechanical actuator thus allowing manually forced override functionality in case of failure of the electric power supply to the electromechanical actuator with minimum complexity, e. g. simplex actuator control electronics and/or electro-magnetic force generation. The invention combines the features of pilot command sending by mechanical linkage and electric power generation with as few as possible parts while providing the wanted power amplification together with the required reliability in aeronautics by reduction of redundancy and complexity for the usage of electro-mechanical powered actuators preferably by using a jam proof electromechanical actuator combined with a mechanical pilot input command linkage; i. e. manual pilot command motion or autopilot actuator, e.g. trim actuator, mechanical input. For small to middle helicopters, the needed actuation force for the inventive control system to transmit the pilot's command to the blades of the rotor(s) allows the use of a smaller actuator without any gear box needed. The actuators of the inventive control system provide continuously a mechanical connection linkage between input and output providing for feedback of the output signal, i. e. position, velocity, to the input signal linkage caused by a pilot command motion, said feedback being advantageously used for command consolidation and generation (displacement/speed error for closed-loop control). The mechanical connection linkage with its manual position override control and load transmission path in case of loss of the electric power portion of the actuator providing transmission of pilot's commands as well in a case of loss of the electric power supply consequently reduces or is abolishing the need for redundancy of the electric power portion of the inventive control system while anyway fulfilling, e. g. in a simplex power portion configuration, the safety requirements of any actuation system where the loss of the simplex power portion for force amplification is considered "Major", i. e. failure probability $<10^{-5}$. Usage of solely electric power sources contributes to the elimination of hydraulic medium and has benefits in terms of maintenance effort, costs and also ecology as hydraulic fluid is a biohazard.

According to a preferred embodiment of the invention linkage stops are provided at the mechanical linkage to the at least one electric position sensor said linkage stops on the one hand limiting the displacement error at the position sensor and on the other hand reducing mechanical tolerance between pilot input "P" and actuator output "A" in the case of direct mechanical transmission if the force-amplification function of the electric component of the actuator is inactive.

According to a further preferred embodiment of the invention displacement error "E" is computed from the difference of the mechanical input command and the actuator output, said difference being determined by the mechanical linkage allowing closed loop architecture.

According to a further preferred embodiment of the invention actuator control electronics are provided, said actuator control electronics being responsive to any offset of the at least one electric position sensor in order to control the rendering of coils of the at least one controllable electromechanical actuator for generation of a linear motion of the electromechanically driven actuator output rod proportional to the input of a continuous pilot command motion "P". The input of the continuous pilot command motion "P" is set to a continuous proportional error signal "E" at the at least one electric position sensor via the lever and the command shaft of the mechanical linkage causing—during normal operation with all electric equipment properly working—an electrically supported subsequent continuous movement "A" of the electromechanically driven actuator output rod. The pilot's command motion causes the position of the electric position sensor linkage to be the swivel point for the output shaft towards the actuator and the subsequently persisting movement of the mechanically linked actuator output rod is maintained till the continuously proportional error signal "E" is back to zero. This is caused by a stop of the pilot input movement, causing the input to be now the swivel point of the output shaft towards the actuator and the subsequently still persisting movement of the output will reduce the proportional error signal "E" back to zero.

Once said respective error "E" is back to zero the drive of the actuator's output shaft is stopped by the actuator control electronics. Any contrary load on the actuator output rod, e. g. by an external load on the blades, will cause the electric position sensor to move—via the shaft of the mechanical linkage—in the opposite direction thus initiating an opposite movement of the electromechanically driven actuator output rod with the result that the inventive control system balances and attenuates automatically any external load and maintains a bias towards the initial position and against the external load as long as the retarding force of the inventive control system is superior to the external load, said retarding force may be enhanced by at least one friction device preferably with a fail-passive design. This way, the inventive mechanical linkage system connecting pilot input "P", actuator output "A" and the position sensor realizes a mechanical summation device for the determination of positioning error "E" at the position sensor location. In contrast to electrical systems for actuator control the determination of the error for the controller according to the invention is accomplished inside the control electronics via electrical summation circuits. The invention employs the leverage not only for determination of the positioning error "E" but also for transmission of pilot command "P" to the actuator output "A" in case of failure of the electrical system. The relative length of the levers determines the force amplification and stroke amplification between pilot command motion "P" and actuator output motion "A".

According to a further preferred embodiment of the invention the at least one controllable, electromechanical actuator has rotary or linear direct drive functionality allowing transformation of versatile mechanical command motions from the pilot. In case of a rotary input and a linear output a gear stage has to be provided at the actuator said gear stage requiring a jam tolerant or jam-proof design dependent from the desired availability/reliability of the inventive control system.

According to a further preferred embodiment of the invention abutment means are provided in a rotary drive for interaction with the linkage stops as mechanical linkage to the output shaft.

According to a further preferred embodiment of the invention at least one force switch is provided for support of the pilot's control of the power supply to the electromechanical actuator in order to switch off the power supply in cases of supposed power portion failure or jam of position sensor linkage allowing the pilot to enable an "electric free wheel" operation of the inventive control system. A natural reaction of any pilot to a disobedient behaviour of an aircraft would be a spontaneously reinforced reaction of the pilot to correct the experienced malfunction. Thus for example in case of an electric malfunction of the actuator of the inventive control system and consequent flight anomalies of the helicopter the pilot will most probably push his input lever spontaneously harder than usually towards the reaction intended by the pilot. The at least one force switch is provided to react to any elevated efforts to enforce the pilot's control commands and switches off the electric power supply towards the electromechanical actuator supposing that a malfunction or a defect of the electromechanical actuator, especially a powered runaway failure, is behind the possibly excessive pilot's reaction. The mechanical connection linkage of lever and output shaft between pilot's input and actuator's output will allow the continued transmission of the pilot's commands to the output at the prize of increased physical efforts due to a switched off electric power supply towards the electromechanical actuator allowing the pilot anyway by means of said mechanical connection linkage to override any electric failures and thus providing a fail safe feature without having to provide redundant electric power supplies and/or electromechanical actuators to the inventive control system.

According to a further preferred embodiment of the invention the at least one force switch is in control of a sloppy lock provided to block the command shaft in response to a pilot's manual input being beyond predetermined force limits. If applicable the force switch interrupts the voltage supply from the electrical power supply towards the electrical means, withholding the sloppy lock from its locking position, and the sloppy lock fixes the command shaft thus eliminating freeplay and/or backlash in the mechanical linkage and providing a stable swivel point for the mechanical linkage transmitting the pilot's manual input to the output via the now passive actuator at the prize of increased physical efforts for the pilot allowing an improved override functionality in case of electric failures of the inventive control system.

According to a further preferred embodiment of the invention at least one position switch is provided instead of or in combination with the force switch as a supplemental control for the sloppy lock blocking the command shaft in response to a pilot's manual input leading to an error "E" at the electric position sensor beyond predetermined amplitude. The at least one position switch reacts to extensive displacement of the second mechanical linkage and consequently switches off the power supply towards the sloppy lock as a result of the pilot's manual input leading to said error "E" exceeding a predetermined amplitude at the command shaft linked to the electric position sensor. As a consequence the sloppy lock fixes the command shaft thus providing the stable swivel point for the mechanical linkage transmitting the pilot's manual input to the output via the now passive actuator at the prize of increased physical efforts for the pilot allowing an improved override functionality in case of electric failures of the inventive control system.

According to a further preferred embodiment of the invention the mechanical linkage of the at least one pilot's command input has changed places with the output shaft towards the actuator for improved kinematics, allowing improved versatility to change ratio between length of pilot command input lever and actuator output lever and consequently amplification rate between pilot command input displacement or force and output displacement or force in case of deactivated electrical force amplification function.

According to a further preferred embodiment of the invention at least one pilot command motion sensor and at least one actuator motion sensor are provided. An assigned electric position sensor is an electric summing unit processing the displacements detected by the pilot command motion sensor at the pilot's command input "P" and the displacements detected by the actuator motion sensor at the output shaft "A" towards the actuator for improved data management.

According to a further preferred embodiment of the invention at least one rotary electro-mechanical actuator and at least one rotary-linear gear unit are provided said rotary electro-mechanical actuator being combined with the rotary-linear gear unit for versatile transmission of the pilot's command input towards the actuator and the output shaft.

According to a further preferred embodiment of the invention duplex, triplex or even quadruplex equipments for each of the electric power supply, the force switch, the controllable, electromechanical actuator, the electric position sensor and the actuator control electronics are provided. The use of duplex electric power supply lines is to be considered for the safety requirements of control systems for which a case of loss of the power portion would have to be rated "Major" (<10-5). In spite of redundant arrangements in general having the disadvantage of higher complexity, mass and cost the inventive redundant arrangement contributes benefits as follows:

redundant position sensors: higher reliability of position information; also detection of certain sensor faults by comparison of redundant sensors, redundant force switch: higher reliability of "power cut-off", redundant power supplies: higher availability of force amplification function, and redundant linear actuators: higher availability of force amplification function.

According to a further preferred embodiment of the invention the duplex electric power supply and the force switch are parallel while the duplex controllable, electromechanical actuators, the duplex electric position sensors and the duplex actuator control electronics are in line respectively for improved reliability of the inventive control system. The probability of mechanical failure of the electromechanical actuators or the duplex electric position sensors is considered to be $<10^{-7}$ compared to $<10^{-4}$ for the probability of electric failure of the electromechanical actuators or the duplex electric position sensors.

According to a preferred embodiment of the invention a method of operating a control system comprises the following steps: a) inputting a command from the pilot or an autopilot actuator via the mechanical command input to move a mechanical linkage of a lever, a command shaft and an output shaft, b) deflecting the shaft of the electric position sensor in a proportional relationship to positioning error consisting of said mechanical command input and actuator output motion, c) providing electric current from a power source to the actuator control electronics, d) controlling said electric current by means of the actuator control electronics in response to the electric signal created by the electric position sensor, i. e. in a proportional relationship with the mechanical positioning error, for creating an electric signal responsive of the amplitude and the speed of said mechanical command input, and e) supplying the controlled current to the actuator for driving the output shaft in a direction to reduce the positioning error in terms of difference between the pilot's input command and the deflection of the actuator output shaft at the electric position sensor towards zero.

According to another preferred embodiment of the invention a method of operating a control system comprises the following steps: a) inputting a command, preferably from the pilot or an autopilot actuator, via the mechanical command input connected to a mechanical linkage of lever, command shaft and output shaft, b) deflecting the command shaft of the electric position sensor in an at least approximately proportional relationship to said mechanical command input for creating an electric signal responsive of the amplitude and/or the speed of said mechanical command input, c) detecting an amplitude and/or speed of said mechanical command input beyond a predetermined threshold, d) switching off the electric current by means of a force switch and/or a position switch and transmitting the mechanical command input by means of the mechanical linkage to the output shaft. An advantage of the inventive control system is that due to its mechanical linkage, for example a pilot will be able, to impose his command inputs to the output shaft of the inventive control system even if after the detection of for example elevated pilot's efforts the power supply has been cut off thus allowing override functionality with the features of a fail-safe system for the inventive control system at the prize that more of the pilot's force will be required for actuation of the inventive control system in cases of a malfunction or a defect of the electric actuator, the power supply, the actuator control electronics or the electric position sensor.

According to a further preferred embodiment of the invention the command shaft of the electric position sensor is fixed after realigning it into a neutral position by means of the sloppy lock. Fixation of the command shaft of the electric position sensor allows proper mechanical leverage of the mechanical command input towards the output shaft and thus improved handling of the mechanical linkage in case of operating the inventive control system without electric support.

BRIEF DESCRIPTION OF THE DRAWINGS

Preferred embodiments of the invention are described by way of the attached drawings.

DETAILED DESCRIPTION OF THE PREFERRED EMBODIMENTS

Figure 1:
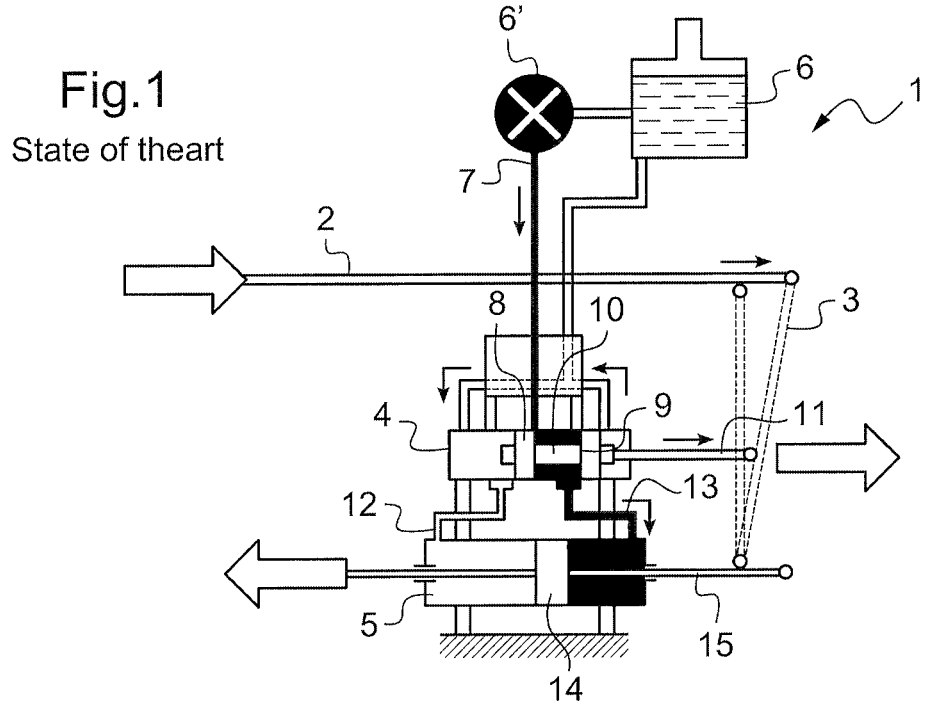
FIG. 1 shows a sample of a control system with a hydraulic actuator displaced from an initial equilibrium according to the state of the art.
Figure 2:
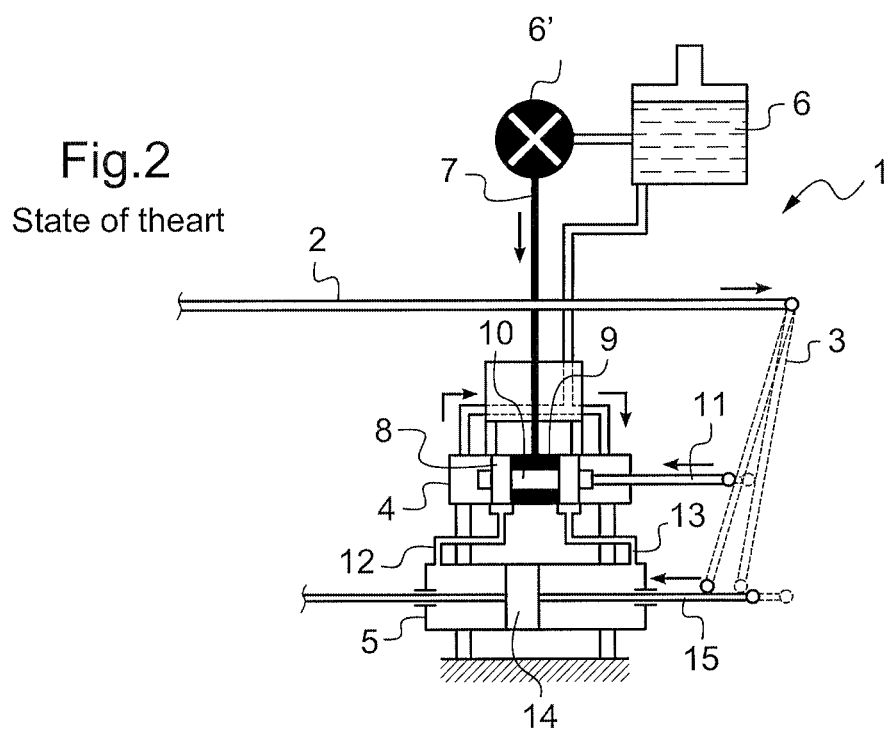
FIG. 2 shows a sample of the control system with a hydraulic actuator in a final equilibrium according to the state of the art.

FIGS. 1, 2: The control system 1 of a pilot's command input comprises a mechanical command input 2, with said input being mechanically transmitted by means of a mechanical linkage comprising a lever 3 to a hydraulic control valve 4 and a hydraulic actuator 5 causing a resulting actuator motion, taking into account manual command motion+speed of said motion of said pilot's command. The pilot's command may be a pilot's manual command or the autopilot actuator.

Hydraulic fluid from a reservoir 6 is supplied under pressure from a pump 6' via a supply line 7 to the hydraulic control valve 4. The hydraulic control valve 4 comprises a left hand and a right hand piston 8, 9 distant from each other and linked by a rod 10. The right hand piston 9 is connected to a command shaft 11 fixed to an intermediate joint of the lever 3. In an equilibrated mid-position (see FIG. 2) the left hand and the right hand pistons 8, 9 cover respectively pressure lines 12, 13 from the hydraulic valve 4 to opposed sides of an actuator piston 14 in the hydraulic actuator 5. The actuator piston 14 is provided on either side with an output shaft 15 towards the lever 3, said output shaft 15 being fixed to one end of the lever 3 and at the opposite side for the resulting actuator motion to the rotor blades (not shown). Without input command the actuator piston 14 is in a mid position of the hydraulic actuator 5. Lever 3 is shown in a neutral and in an actuated position.

If the lever 3 is pushed aside, e. g. by a pilot's command, the command shaft 11 at the intermediate joint of the lever 3 will be proportionally moved and will pull the left hand and the right hand pistons 8, 9 in the hydraulic valve 4 correspondingly aside to a position in which the pressure lines 12, 13 inside the hydraulic valve 4 are uncovered and e. g. pressure line 13 is connected to the hydraulic fluid under pressure from the supply line 7 to the cylinder space at the side of the actuator piston 14 in the hydraulic actuator 5 oriented to the same side as the pistons 8, 9 in the hydraulic valve 4 are pulled. Subsequently the actuator piston 14 will be moved and an actuator motion will be produced pulling the end of the lever 3 by means of the output shaft 15 contrary to the direction of the pilot's command. With the lever 3 the left hand and the right hand pistons 8, 9 in the hydraulic valve 4 are set back with the command shaft 11 to a re-equilibrated position by compensating the hydraulic volumes at the respective sides of the pistons 8, 9 and 14.

Figure 3:
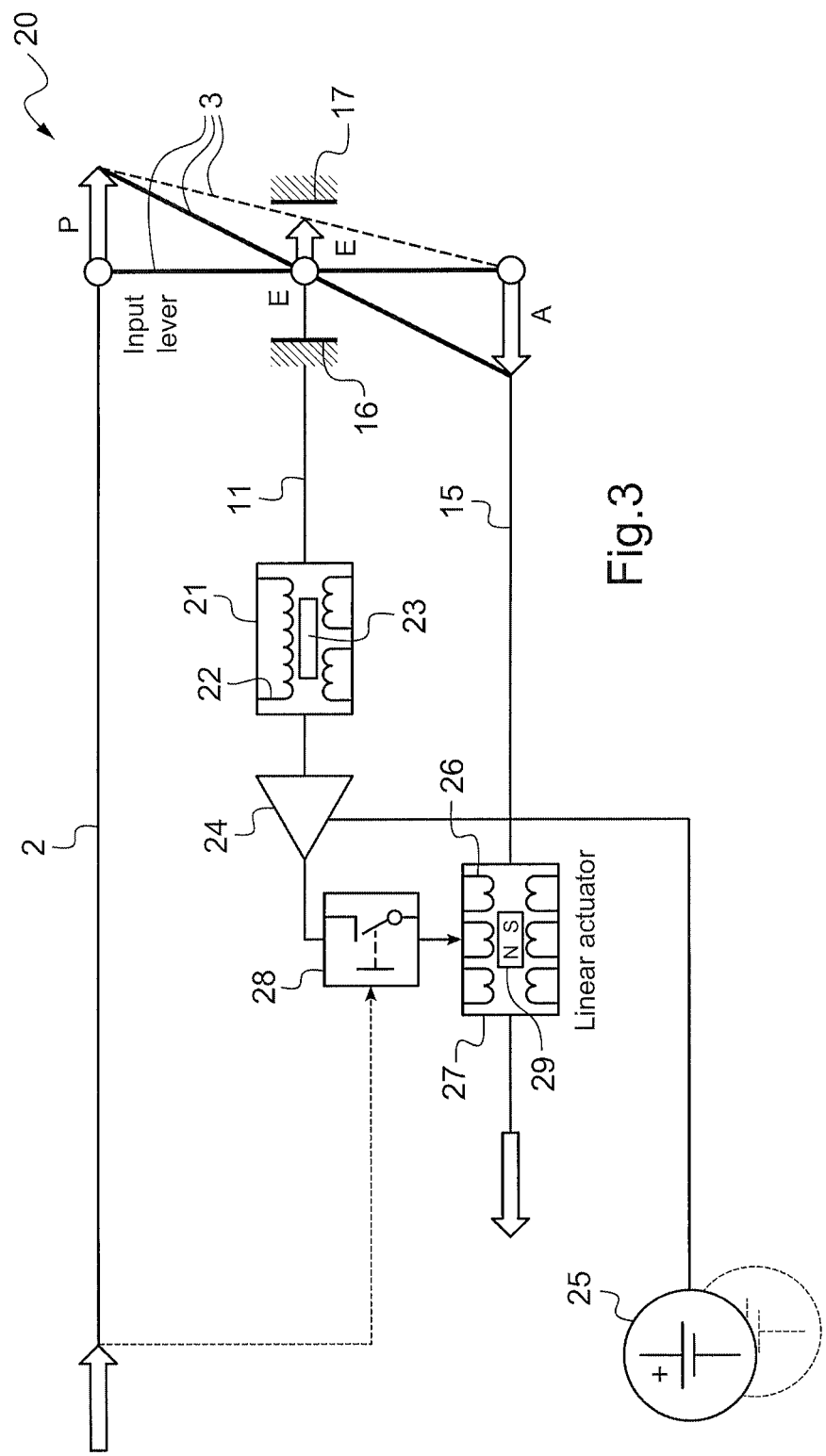
FIG. 3 shows a schematic lay out of a first embodiment of the control system according to the invention.

FIG. 3: Corresponding features are referred to by the same references as in FIGS. 1, 2. A first embodiment of the control system 20 of pilot command inputs for a small or medium helicopter is provided with a mechanical input 2 for linear transmission of said pilot command inputs with an input linear force in the range of approximately 10 N to up to 500 N to a lever 3 of a mechanical linkage. Lever 3 is shown in a vertical, neutral position, in an intermediate actuated position in a dotted line and in an inclined actuated position. A command shaft 11 is fixed to an intermediate joint of the lever 3 and mechanically linked to an electric position sensor 21 of said input command. Linkage stops 16, 17 are provided on either side of the intermediate joint at the lever 3 to limit the stroke of the command shaft 11.

The electric position sensor 21 is provided with an electric solenoid 22 arranged around an induction core 23 inducing to the electric solenoid 22 an electric current representative of displacement and speed of any movement of said command shaft 11 of electric position sensor 21 relative to the induction core 23.

Actuator control electronics 24 are fed from an electric power supply 25. An error signal "E" of any movement of the command shaft 11 at the intermediate joint of lever 3, is created as a result of the stroke "P" of the pilot's command, being subtracted by the mechanical linkage from the stroke of the actuator's output "A" to provide electric signals corresponding to the electric position sensor 21.

Said electric signals are communicated to said actuator control electronics 24 creating and amplifying electric commands for excitation of coils 26 of a linear electromechanical actuator 27. The electric commands are passed from the actuator control electronics 24 via a force switch 28 to the coils 26 of the electromechanical actuator 27 said coils 26 being mounted in the casing of the electromechanical actuator 27 concentric to a magnetic dipole 29 inside the electromechanical actuator 27. The electromechanical actuator 27 is consequently controlled correspondingly to the displacement and speed detected at said electric position sensor 21 and being proportional to the manual pilot command inputs via the lever 3 of the mechanical linkage. The electric commands from the actuator control electronics 24 are transformed into resulting linear actuator motion of output shaft 15 of the electromechanical actuator 27 with a linear output stroke in the range of 10 to 500 mm and a linear output force in the range of 50 N to 5 kN. If the error signal "E" is zero the actuator control electronics 24 sets the resulting actuator motion of the output shaft 15 of the electromechanical actuator 29 as well to zero.

The force switch 28 is mechanically controlled by the pilot's input commands, said control activating the force switch 28 to interrupt the electric power supply 25 towards the electromechanical actuator 27 after detection that a predetermined force threshold has been exceeded by a pilot's command in order to prevent loss of control in cases of electric failures, especially powered run-away failures. A plurality, two or more electric power supplies may be provided for back up of the electric power portion, i. e. actuator control electronics 24 for signal processing and control, monitoring, power electronics and electro-magnetic force generation.

The mechanical input signal from the pilot's command is applied via the lever 3 and the output shaft 15 of the mechanical linkage to the controllable electromechanical actuator 27, said output shaft 15 of the electromechanical actuator 27 being mounted to an end of the lever 3 opposite to the input signal of the pilot's command 2. Irrespective of the functioning of the electric power portion any mechanical input signal from a pilot's command 2 is transmitted via the mechanical linkage of lever 3 and the output shaft 15 to the electromechanical actuator 27 and from there to the blades of the rotor, particularly if the mechanical linkage is rotatable held at an intermediate point between the ends of the lever 3. The mechanical amplification ratio from the pilot's command 2 via the mechanical linkage of lever 3 to the output shaft 15 is free to be defined in accordance with the required gear ratio of the specific application.

Friction means (not shown) of fail-passive design are provided to maintain the output shaft 15 in between subsequent pilot commands.

Figure 4:
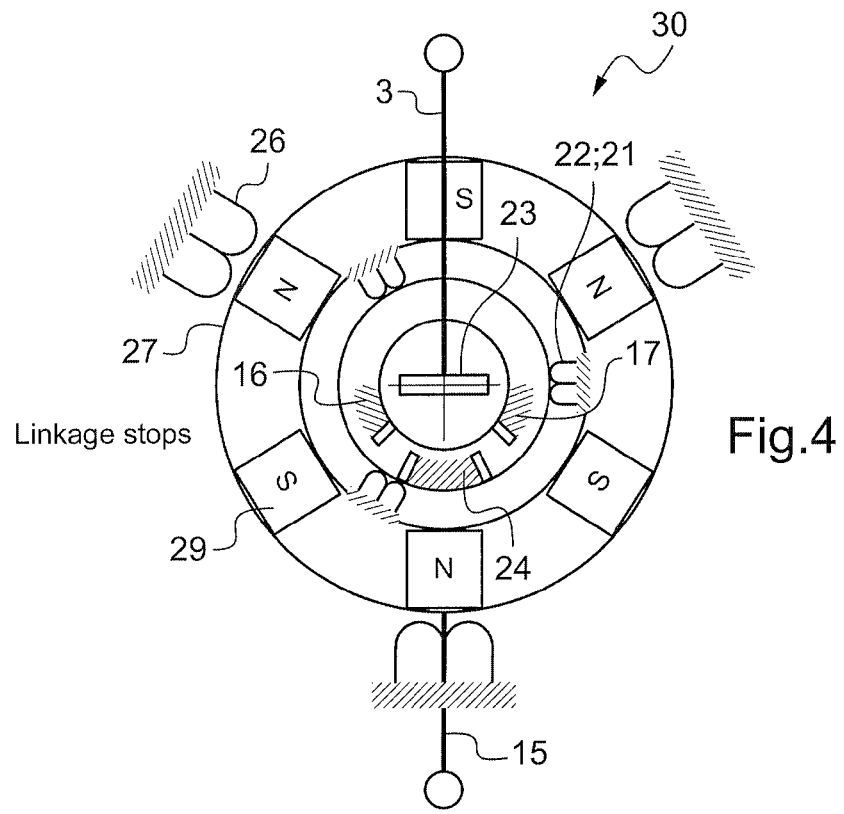
FIG. 4 shows a schematic lay out of a rotary actuator in an initial equilibrium according to FIG. 3.
Figure 5:
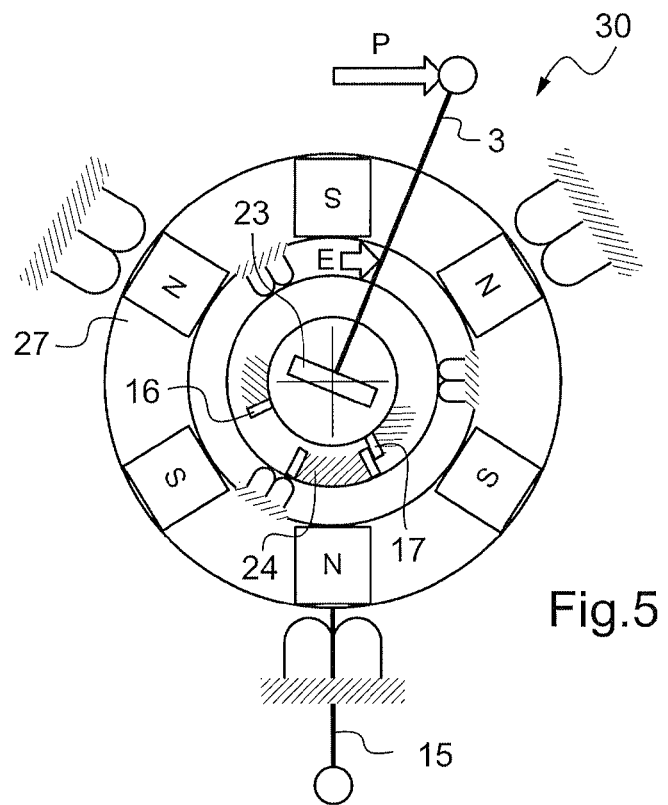
FIG. 5 shows a schematic lay out of the rotary actuator after a pilot command motion with a rotation error according to FIG. 4.
Figure 6:
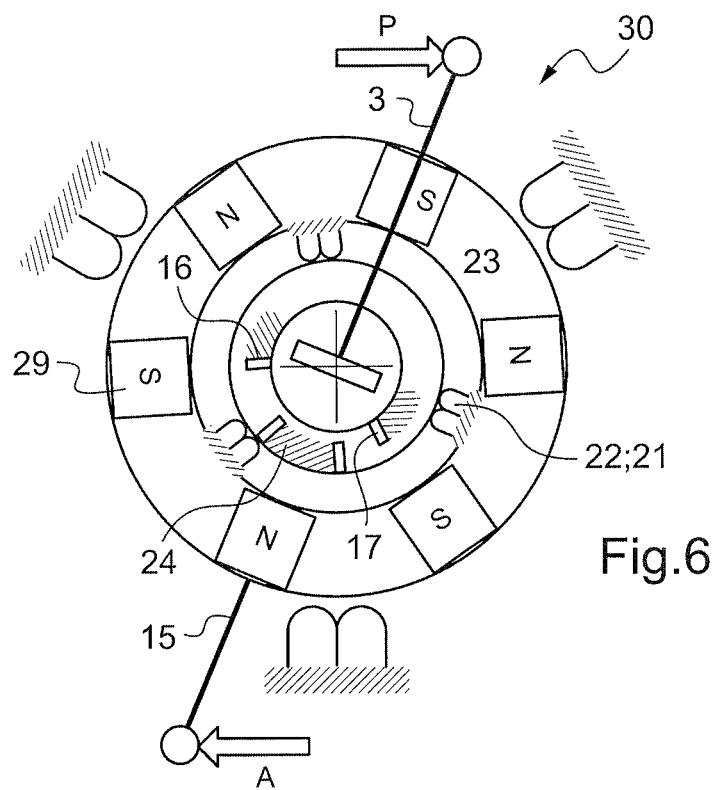
FIG. 6 shows a schematic lay out of the rotary actuator with a resulting actuator motion according to FIG. 5.

FIG. 4-6: Corresponding features are referred to by the same references as in FIG. 1-3. In the control system 30 the manual pilot command inputs are transmitted mechanically via the lever 3 to a rotary actuator in the form of a pivot like arranged induction core 23 inside the concentric electric solenoid 22 of the electric position sensor 21 inducing to the electric solenoid 22 an electric current representative of displacement and speed of any rotation of the lever 3 relative to said electric position sensor 21. This arrangement represents preferred application of RVDT as rotary position sensor for measurement of rotation/displacement error "E".

Linkage stops 16, 17 are provided said linkage stops being mechanically combined to lever 3 of the pilot's command input. Abutment means 24 are provided for interaction with said linkage stops 16, 17 said abutment means 24 being mechanically combined to output shaft 15 for limiting the pilot command input "P" of lever 3 relative to the actuator output "A" of shaft 15.

Actuator control electronics (not shown) are fed from an electric power supply (not shown). The rotation/displacement error "E" of any rotation of the magnetic core and/or stator 23 as a consequence of any movement of the lever 3 is detected by the electric position sensor 21, as a result of the stroke "P" of the pilot's command, being subtracted by the mechanical linkage from the stroke of the actuator's output shaft 15 to provide electric signals corresponding to the rotation/displacement error "E" at the electric position sensor 21 relative to the signal's input.

Said electric signals from the electric position sensor 21 are communicated to said actuator control electronics creating and amplifying electric commands for excitation of the coils 26 of the rotary electromechanical actuator 27 said coils 26 being mounted concentrically to the casing of the electromechanical actuator 27 and concentric to preferably three magnetic dipoles 29 inside the electromechanical actuator 27. The magnetic dipoles 29 are movable relative to the electromechanical actuator 27. The output shaft 15 of the electromechanical actuator 27 is mounted to the magnetic dipoles 29.

The rotation/displacement error "E at said electric position sensor 21 relative to manual pilot command inputs at the lever 3 are transformed by the electric commands from the actuator control electronics into resulting rotary actuator motion and corresponding rotation of the output shaft 15.

In case the actuator control electronics and/or the power supply are deficient the mechanical linkage by lever 3 will rotate the output shaft 15 directly via either of the linkage stops 16, 17 forcing the abutment means 24 to transmit mechanically the rotation from the pilot's input command to the output shaft 15.

Figure 7:
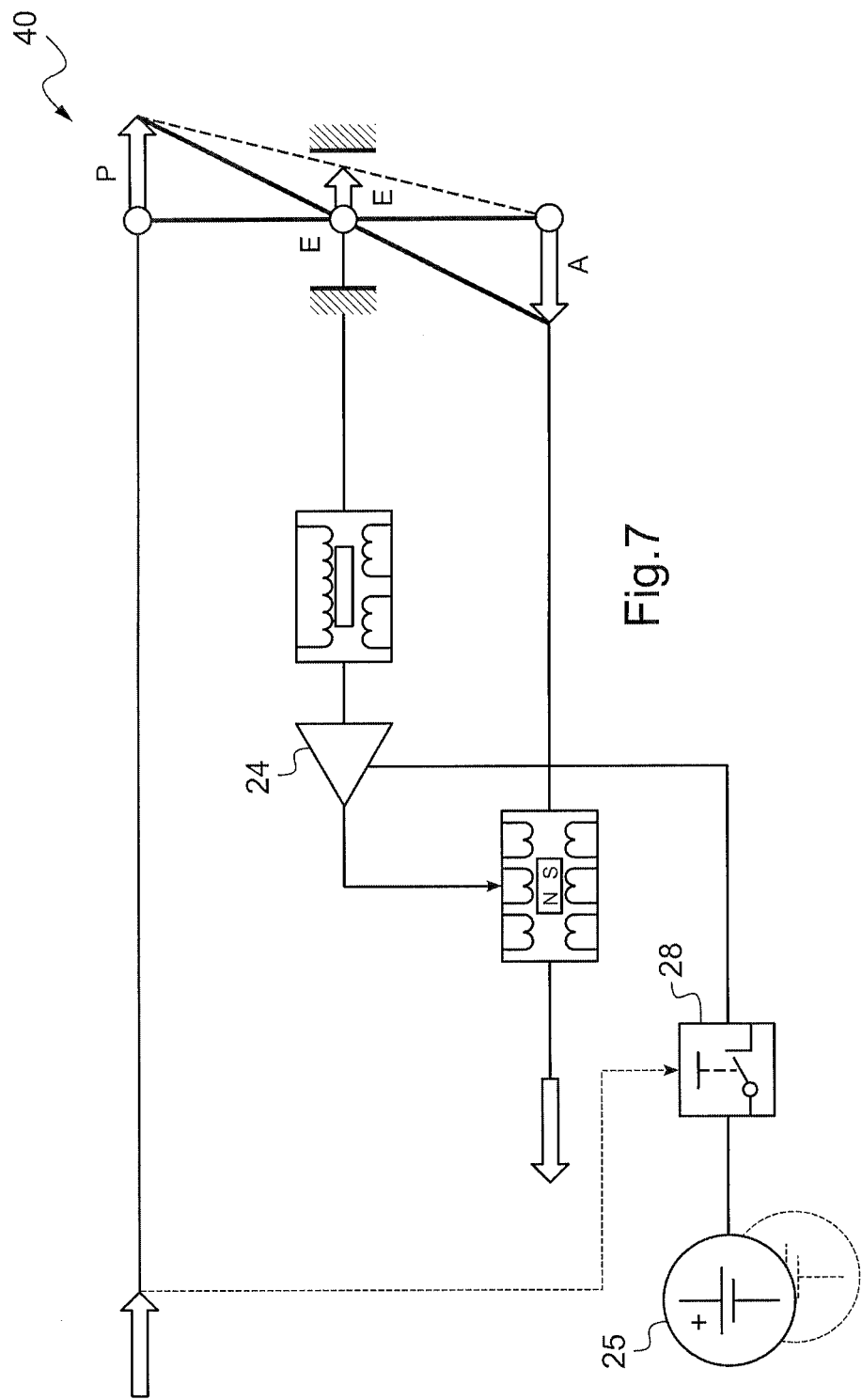
FIG. 7 shows a schematic lay out of a second embodiment of the control system according to the invention.

FIG. 7: Corresponding features are referred to by the same references as in FIG. 1-6. The second embodiment of a control system 40 corresponds essentially to the control system of FIG. 3 apart from the arrangement of the force switch 28 said force switch 28 being electrically controlled by the pilot's input commands activating the force switch 28 to interrupt the electric power supply 25 to the actuator control electronics 24 after detection that a predetermined force threshold of a pilot's command has been passed in order to prevent loss of control in cases of electric failures, especially powered run-away failures.

Figure 8:
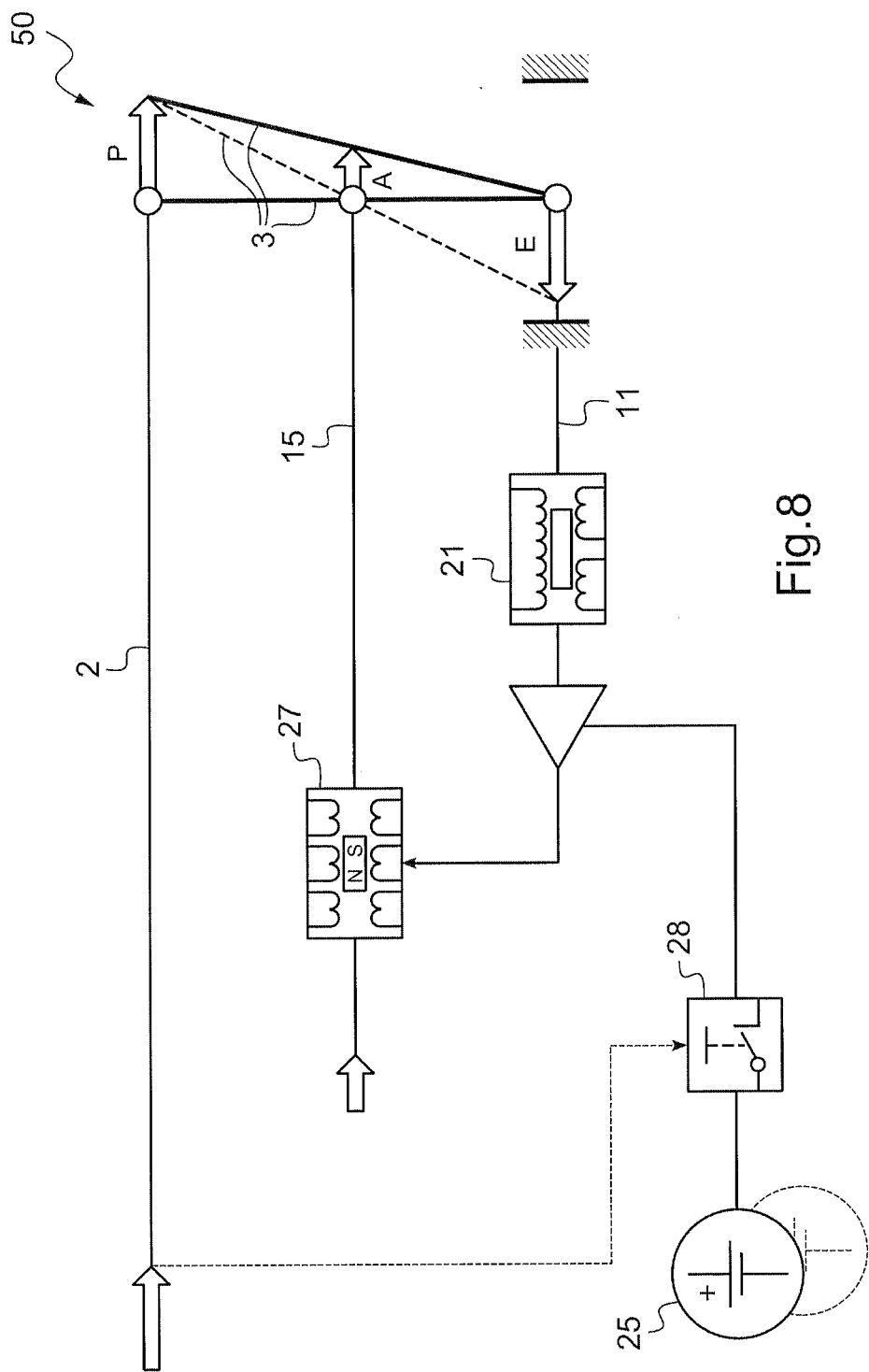
FIG. 8 shows a schematic lay out of a third embodiment of the control system according to the invention.

FIG. 8: Corresponding features are referred to by the same references as in FIG. 1-7. The third embodiment of a control system 50 corresponds essentially to the control system of FIG. 7 apart from the arrangement of the output shaft 15 of the electromechanical actuator 27 being linked to the intermediate joint at the lever 3 and the command shaft 11 to the electric position sensor 21 being mounted to the end of the lever 3 opposite to the command's input.

Figure 9:
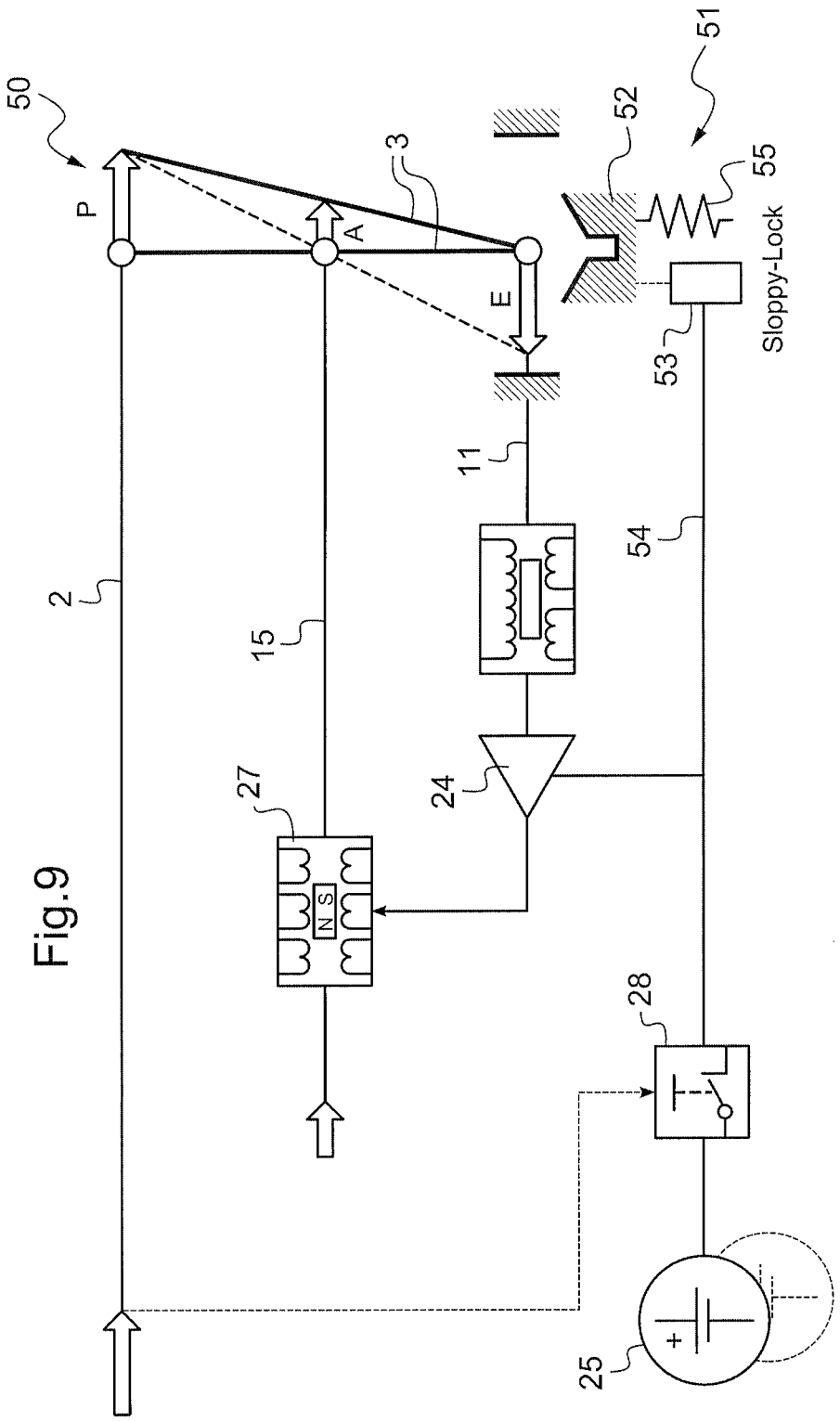
FIG. 9 shows a schematic lay out of the third embodiment with a further option of the control system according to the invention.
Figure 10:
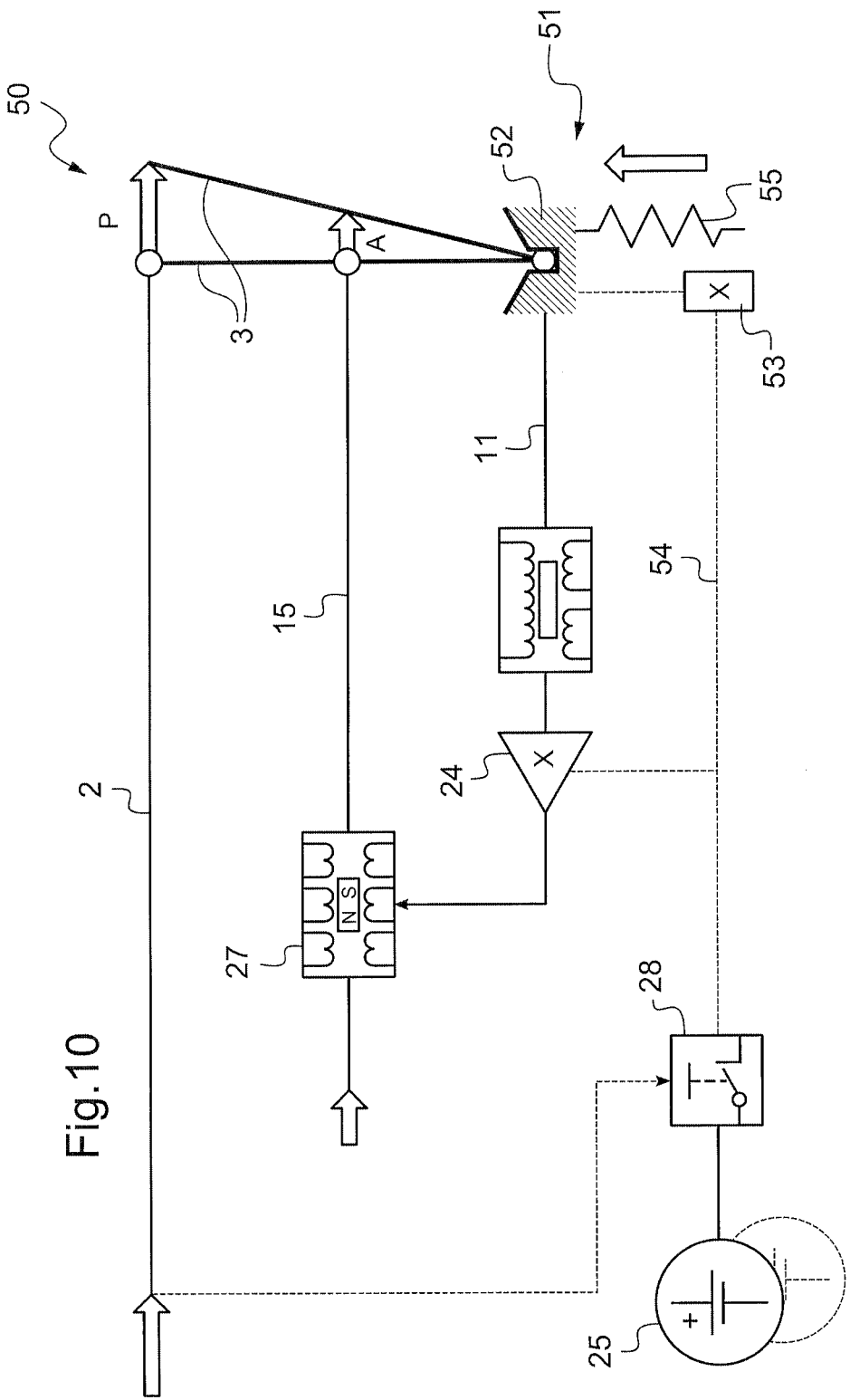
FIG. 10 shows a schematic lay out of the third embodiment with the further option of the control system according to FIG. 9.

FIGS. 9, 10: Corresponding features are referred to by the same references as in FIG. 1-8. The control system 50 of FIG. 8 is provided with a supplemental safety device 51 mounted next to the command shaft 11 to the electric position sensor 21 at the end of the lever 3 opposite to the command's input.

The supplemental safety device 51 comprises a sloppy lock 52 for the joint of the lever 3 to the command shaft 11. The sloppy lock 52 is movable between a position distant from the command shaft 11 and a locking position for the command shaft 11. Said movable sloppy lock 52 is withheld from the locking position by electrical means 53 connected to the power supply via a supply line 54 controlled by the force switch 28. In the position of the sloppy lock 52 distant from the end of the lever 3 the sloppy lock 52 is preloaded by a spring 55 towards the locking position.

With the pilot's commands being within the predetermined force limits the control system 50 is operative without restrictions and the sloppy lock 52 is withheld from the locking position by the electrical means 53 against the preloaded spring 55. The electrical means 53 are fed via the force switch 28 from the electrical power supply 25 to retain the sloppy lock 52 free from the command shaft 11 against the force from the preloaded spring 55.

If one of the pilot's commands is beyond the predetermined force limits the force switch 28 is activated and the actuator control electronics 24 as well as the linear actuator 27 of the control system 50 are shut off from the power supply 25 with the consequence of no actuator support for the transmission of the pilot's input commands towards the blades of the rotor(s). Solely the mechanical linkage 2, 3, 11 and 15 remains between the pilot's input commands and the blades of the rotor(s). The activated force switch 28 interrupts as well the supply of current towards the electrical means 53 for retaining the sloppy lock 52 distant from the locking position and consequently the sloppy lock 52 is urged by the preloaded spring 55 in locking engagement with the command shaft 11, particularly the joint of the command shaft 11 with the lever 3. Bevel shaped surfaces 56 of the sloppy lock 52 are provided for realignment of the joint of the command shaft 11 with the lever 3 into the form lock of the sloppy lock 52.

Figure 11:
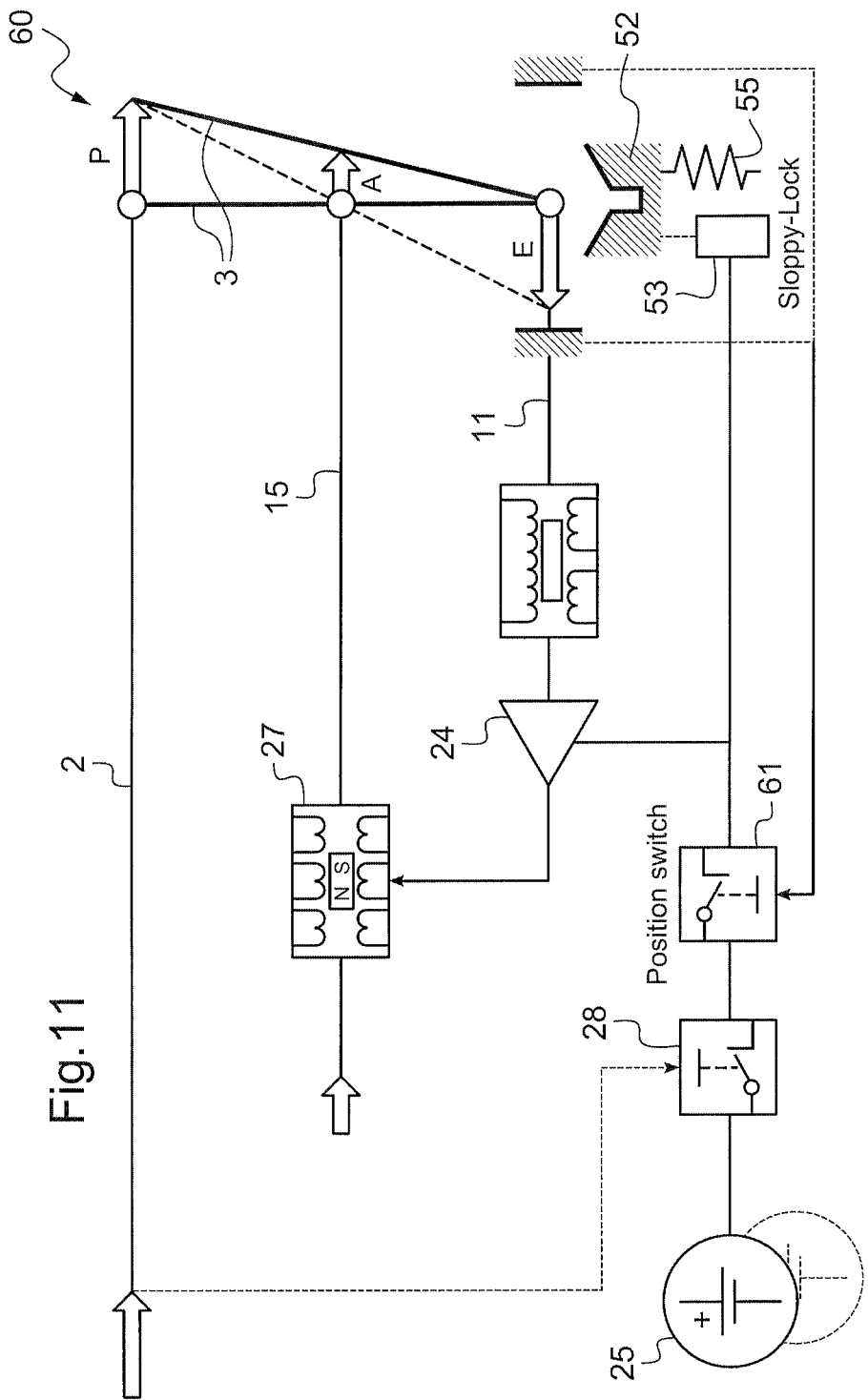
FIG. 11 shows a schematic lay out of a fourth embodiment of the control system according to the invention.

FIG. 11: Corresponding features are referred to by the same references as in FIG. 1-10. The fourth embodiment of the control system 60 corresponds essentially to the control system 50 of FIGS. 9, 10 with additionally a position switch 61 in line to the force switch 28.

With the position/displacement error "E" being within the predetermined displacement limits the control system 60 is operative without restrictions and the sloppy lock 52 is withheld from the locking position by the electrical means 53 against the preloaded spring 55. The electrical means 53 are fed via the force switch 28 and the position switch 61 from the electrical power supply 25 to retain the sloppy lock 52 against the force from the preloaded spring 55.

If position/displacement error "E" goes beyond the predetermined displacement limits the position switch 61 is activated and the actuator control electronics 24 as well as the linear actuator 27 of the control system 60 are shut off from the power supply 25 with the consequence of no actuator support for the transmission of the pilot's input commands towards the blades of the rotor(s). Solely the mechanical linkage 2, 3, 11, 15 remains between the pilot's input commands and the blades of the rotor(s). The activated position switch 61 interrupts the supply of current towards the electrical means 53 for retaining the sloppy lock 52 away from its locking position and consequently the sloppy lock 52 is urged by the preloaded spring 55 in locking engagement with the command shaft 11, particularly in locking engagement with the joint of the command shaft 11 with the lever 3.

Figure 12:
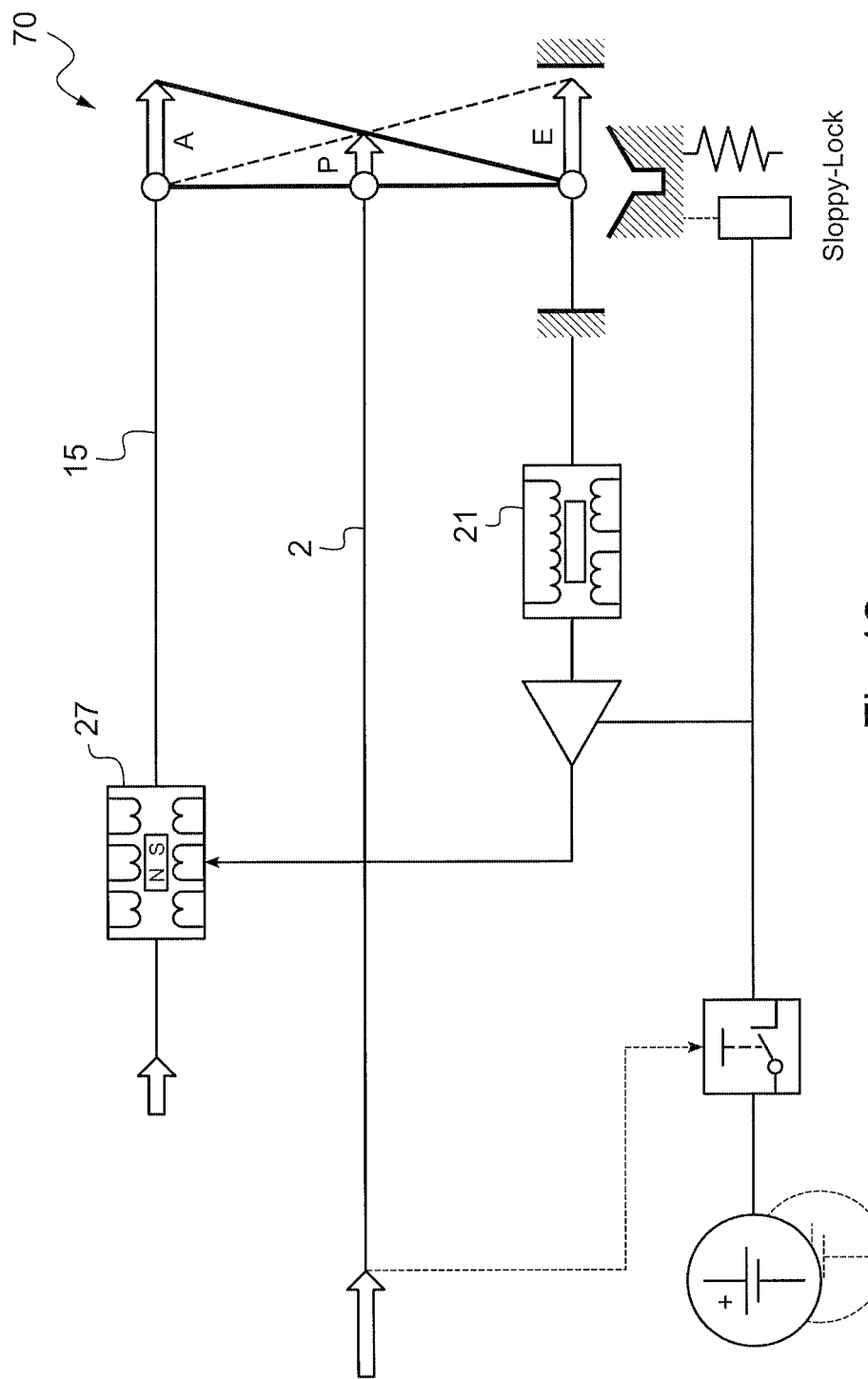
FIG. 12 shows a schematic lay out of a fifth embodiment of the control system according to the invention.

FIG. 12: Corresponding features are referred to by the same references as in FIG. 1-11. The fifth embodiment of the control system 70 corresponds essentially to the control system 50 of FIG. 9 with the pilot's command input 2 having changed place with the output shaft 15 towards the actuator 27.

Figure 13:
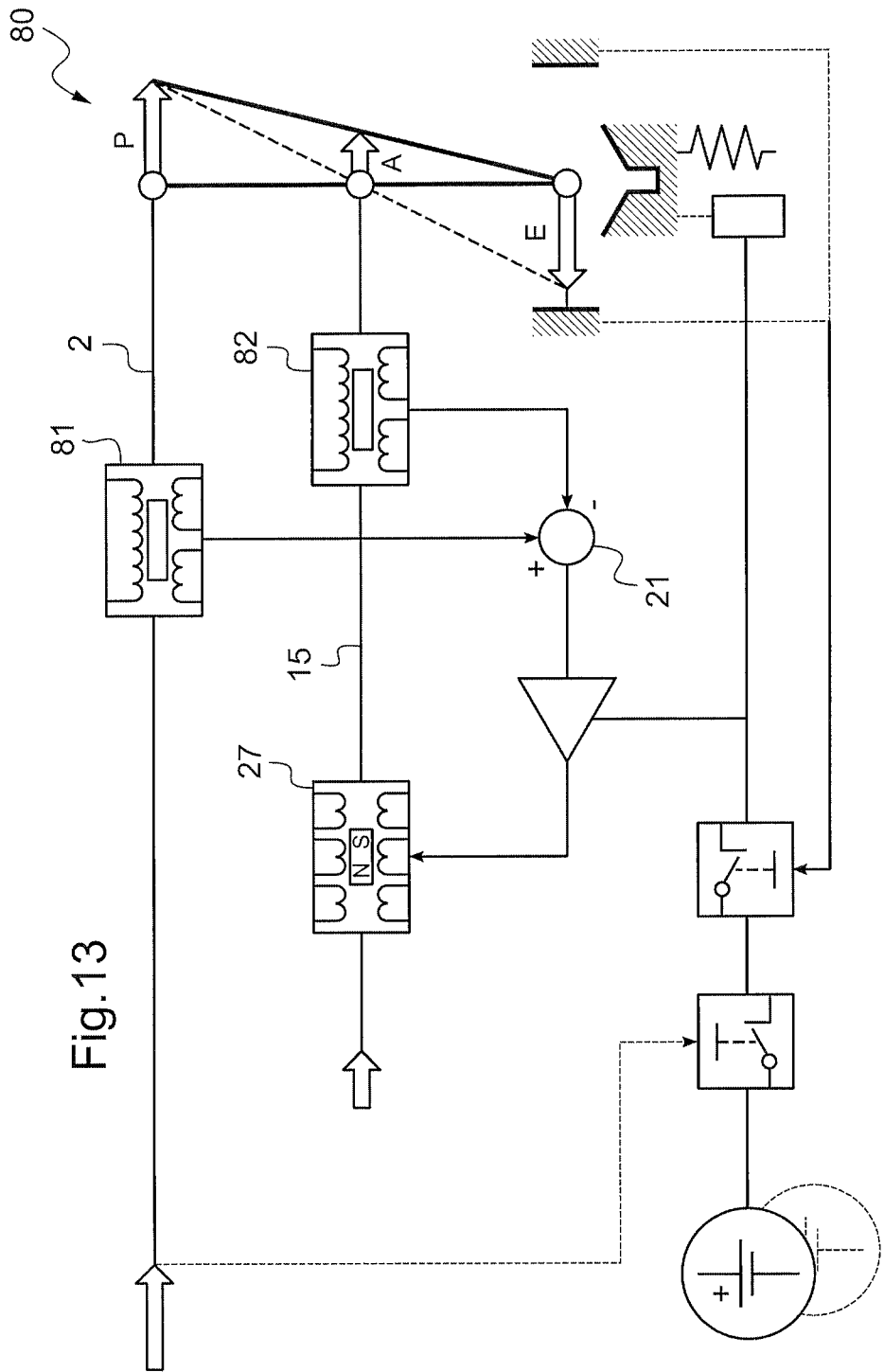
FIG. 13 shows a schematic lay out of a sixth embodiment of the control system according to the invention.

FIG. 13: Corresponding features are referred to by the same references as in FIG. 1-12. The sixth embodiment of the control system 80 corresponds essentially to the control system 60 of FIG. 11 with the electric position sensor 21 being an electric summing unit processing the displacements detected by a pilot command motion sensor 81 at the pilot's command input 2 and the displacements detected by an actuator motion sensor 82 at the output shaft 15 towards the actuator 27.

Figure 14:
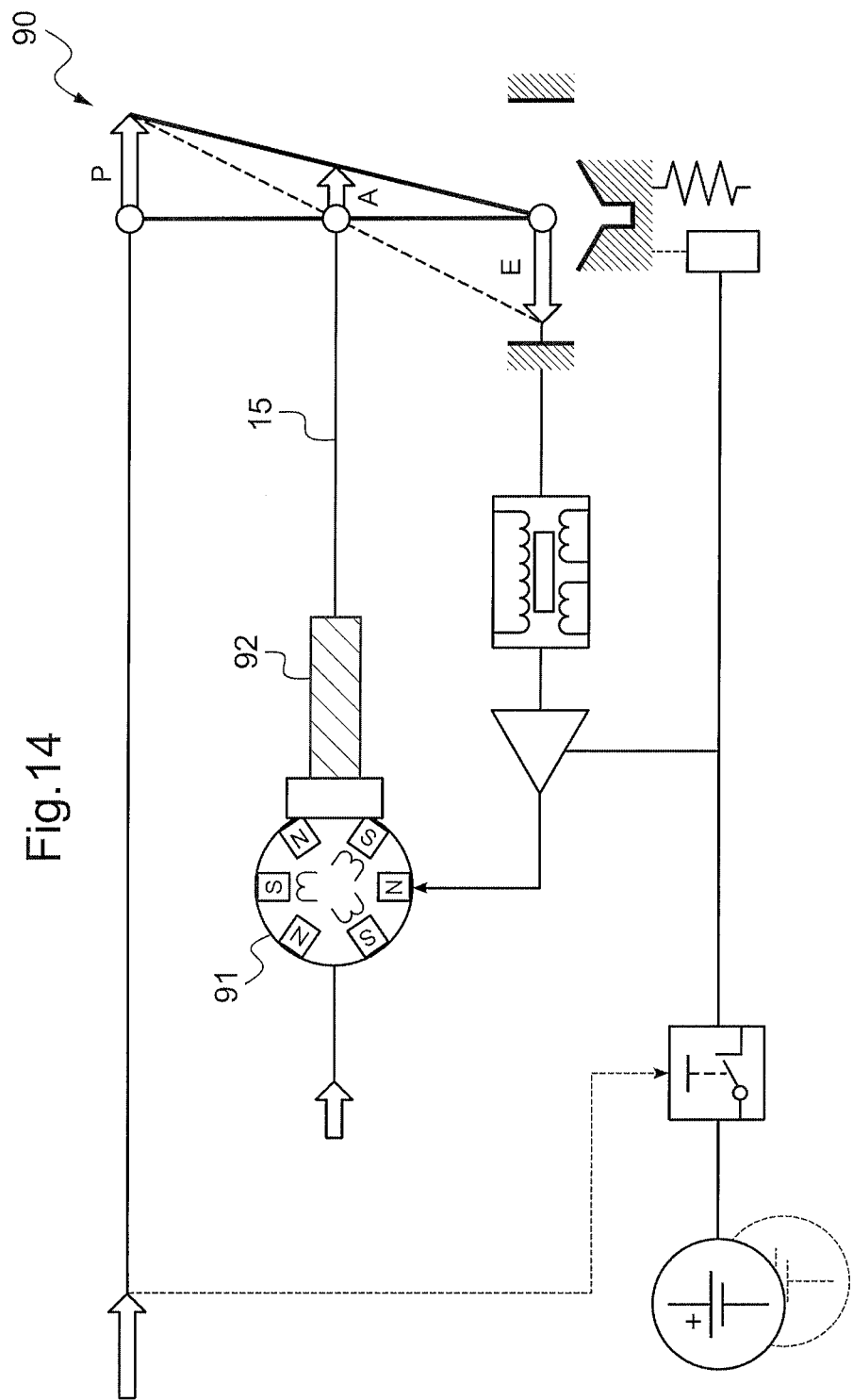
FIG. 14 shows a schematic lay out of a seventh embodiment of the control system according to the invention.

FIG. 14: Corresponding features are referred to by the same references as in FIG. 1-13. The seventh embodiment of the control system 90 corresponds essentially to the control system 50 of FIG. 9 with a rotary electro-mechanical actuator 91 combined with a rotary-linear gear unit 92 for versatile transmission of the pilot's command input towards the actuator 91 and the output shaft 15. The rotary-linear gear unit 92 is equipped with either ball- or roller screws.

Figure 15:
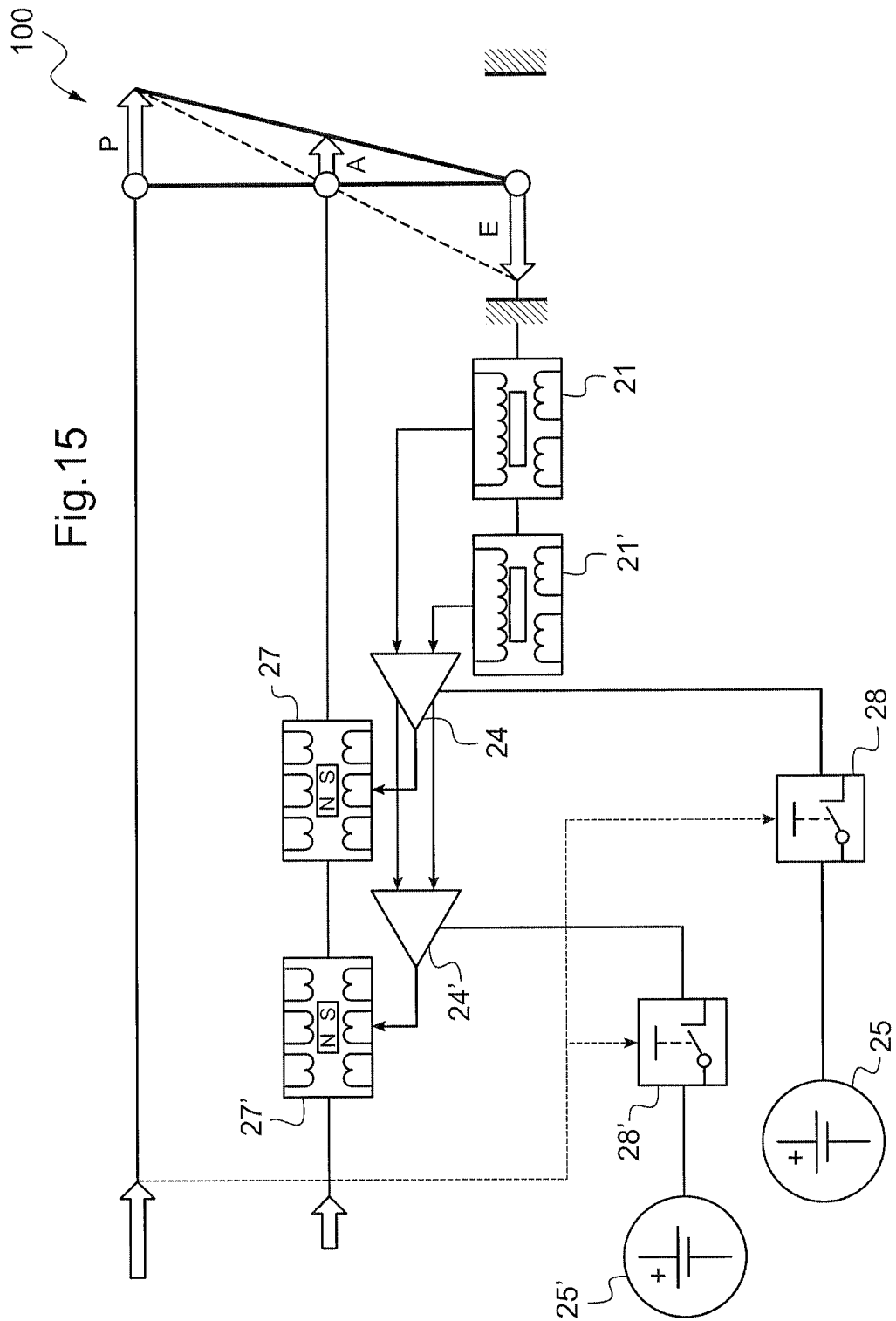
FIG. 15 shows a schematic lay out of an eighth embodiment of the control system according to the invention.

FIG. 15: Corresponding features are referred to by the same references as in FIG. 1-14. The eighth embodiment of the control system 100 corresponds essentially to the control system 50 of FIG. 8 with a duplex equipment for the electric power supply 25, 25', the force switch 28, 28', the controllable, electromechanical actuator 27, 27', the electric position sensor 21, 21' and the actuator control electronics 24, 24', with said duplex electric power supply 25, 25', said duplex force switch 28, 28' and duplex actuator control electronics 24, 24' dedicated to the duplex force-adding electromechanical actuators 27, 27', while both of the duplex electric position sensors 21, 21' are evaluated by both actuator control electronics 24, 24' for the purpose of detection of sensor failures.

Method of operating a control system according to the invention

The method of operating is described by way of the control systems 50, 60 according to the third and fourth embodiments of FIGS. 9, 10 and 11. In case of an input command from the pilot via the mechanical command input 2 the retaining loads from the friction device, the inertia of the blades and aerodynamic forces maintain the output shaft in its position and thus the joint of the lever 3 to the output shaft 15 first becomes a swivel point for any rotation of the lever 3, said rotation allowing the command shaft 11 of the mechanical linkage to the electric position sensor 21 to move in a proportional relationship with the mechanical command input 2 said proportional relationship being determined by the distances between the respective joints of the output shaft 15 and the mechanical command input 2 at the lever 3 input. The proportional movement of the command shaft 11 is mechanical input for the electric position sensor 21 reflecting speed and amplitude of the pilot's command 2. Said mechanical input is transformed by the electric position sensor 21 to electric signals used to control the current from the electric power supply 25 to the electromechanical actuator 27. Said control is effected by the actuator control electronics 24 and loaded to the electromechanical actuator 27 for driving the output shaft 15 relative to the electromechanical actuator 27 in a direction which will bring back the difference between the pilot's input command "P" and actuator output motion "A" in terms of the displacement error "E" of the command shaft 11 towards zero by the mechanical linkage with the swivel point for any rotation of the lever 3 being then at the joint of the mechanical command input 2 imposing the pilot's command motion "P" to the lever 3.

In case of an assumed failure in the electric power portion which is assumed if a pilot's command is detected by the force switch 28 and/or the position error switch 61 that is beyond a predetermined threshold the electric power supply 25 will be cut off. The sloppy lock 52 will close and thus the joint of the lever 3 to the command shaft 11 becomes a swivel point for any rotation of the lever 3. Said rotation is transmitted to the output shaft 15 of the mechanical linkage to the electromechanical actuator 27 and will move said output shaft in a proportional relationship determined by the distances between the respective joints of the output shaft 15 and the mechanical command input 2 relative to the joint of the lever 3 to the command shaft 11 thus providing an mechanical override functionality without electric force amplification to support the pilot by reducing his workload.

What is claimed is:

1. A control system, particularly a control system for pilot command inputs, with:
   a mechanical input command,
   an actuator output, at least one electric position sensor connected to a mechanical linkage suitable to measure a displacement error between said input command and a displacement of said actuator output,
   at least one electric power supply, at least one controllable, electromechanical actuator fed by the at least one electric power supply and controlled by the at least one electric position sensor, and
   the mechanical input command is applied via a mechanical linkage with a lever and said actuator output to the at least one controllable electromechanical actuator characterized in that said mechanical input command is applied by means of the lever in parallel to said actuator output to a command shaft for the at least one electric position sensor.

2. A control system according to claim 1, wherein the displacement error is computed from the difference of the mechanical input command and the actuator output, said difference being determined by the mechanical linkage.

3. A control system according to claim 1, wherein the mechanical linkage of the at least one pilot's command input to the lever is at the place of the output shaft towards the electromechanical actuator and vice versa.

4. A control system according to claim 1, wherein linkage stops are provided for the command shaft to the at least one electric position sensor said linkage stops limiting any bi-directional stroke of the command shaft.

5. A control system according to claim 4, wherein abutment means are provided for interaction with the linkage stops as mechanical linkage to the output shaft.

6. A control system according to claim 1, wherein actuator control electronics are provided responsive to any displacement error at the at least one electric position sensor controlling the electromechanical actuator.

7. A control system according to claim 6, wherein a pilot command motion sensor and an actuator motion sensor are provided and in that an assigned electric position sensor is an electric summing unit processing the displacements detected by the pilot command motion sensor at the pilot's command input and the displacements detected by the actuator motion sensor at the output shaft relative to the electromechanical actuator.

8. A control system according to claim 6, wherein at least one force switch is provided for the pilot's control of the power supply for the electromechanical actuator.

9. A control system according to claim 8, wherein at least one sloppy lock is provided said sloppy lock being controlled by the force switch to block the command shaft in response to the pilot's manual input.

10. A control system according to claim 9, wherein at least one position switch is provided said position switch being in line with the force switch as a supplemental control for the sloppy lock blocking the command shaft in response to a position error beyond a predetermined amplitude.

11. A control system according to claim 8, wherein a duplex or triplex equipment is provided, respectively for each of the electric power supply, the force switch, the controllable, electromechanical actuator, the electric position sensor and the actuator control electronics.

12. A control system according to claim 11, wherein said duplex electric power supply, the force switch and the duplex actuator control electronics are parallel while the duplex controllable, electromechanical actuators and the duplex electric position sensors are in line respectively.

13. A method of operating a control system according to claim 6, wherein:
    a) inputting a command, preferably from the pilot or an autopilot actuator via the mechanical input command to move a mechanical linkage of lever, command shaft and output shaft (15),
    b) deflecting the command shaft of the electric position sensor in an at least approximately proportional relationship to said mechanical command input for creating an electric signal responsive of the amplitude and the speed of said mechanical command input,
    c) providing electric current from the power supply to the actuator control electronics,
    d) controlling said electric current responsive to the electric signal created by the electric position sensor by means of the actuator control electronics, and
    e) supplying the controlled current to the actuator for driving the output shaft in a direction to reduce the difference between the pilot's input command and the deflection of the command shaft of the electric position sensor towards zero.

14. A method according to claim 13, wherein:
    a) inputting a command, preferably from the pilot or an autopilot actuator via the mechanical input command connected to a mechanical linkage of lever, command shaft and output shaft;
    b) deflecting the command shaft of the electric position sensor in an at least approximately proportional relationship to said mechanical command input for creating an electric signal responsive of the amplitude and/or the speed of said mechanical command input;
    c) detecting an amplitude and/or speed of said mechanical input command beyond a predetermined threshold;
    d) switching off the electric current with a force switch and/or a position switch; and
    e) transmitting the mechanical command input by means of lever to the output shaft.

15. Method according to claim 13, characterized by fixing the command shaft of the electric position sensor by means of the sloppy lock.

16. A control system according to claim 1, wherein the at least one controllable, electromechanical actuator is rotary or linear.

17. A control system according to claim 16, wherein the at least one controllable, rotary or linear electromechanical actuator is a direct drive.

18. A control system according to claim 16, wherein a rotary electro-mechanical actuator and a rotary-linear gear unit are provided at the output shaft said rotary electro-mechanical actuator being combined with the rotary-linear gear unit for transmission of the pilot's command input towards the electromechanical actuator and the output shaft.

* * * * *